Figure 1:
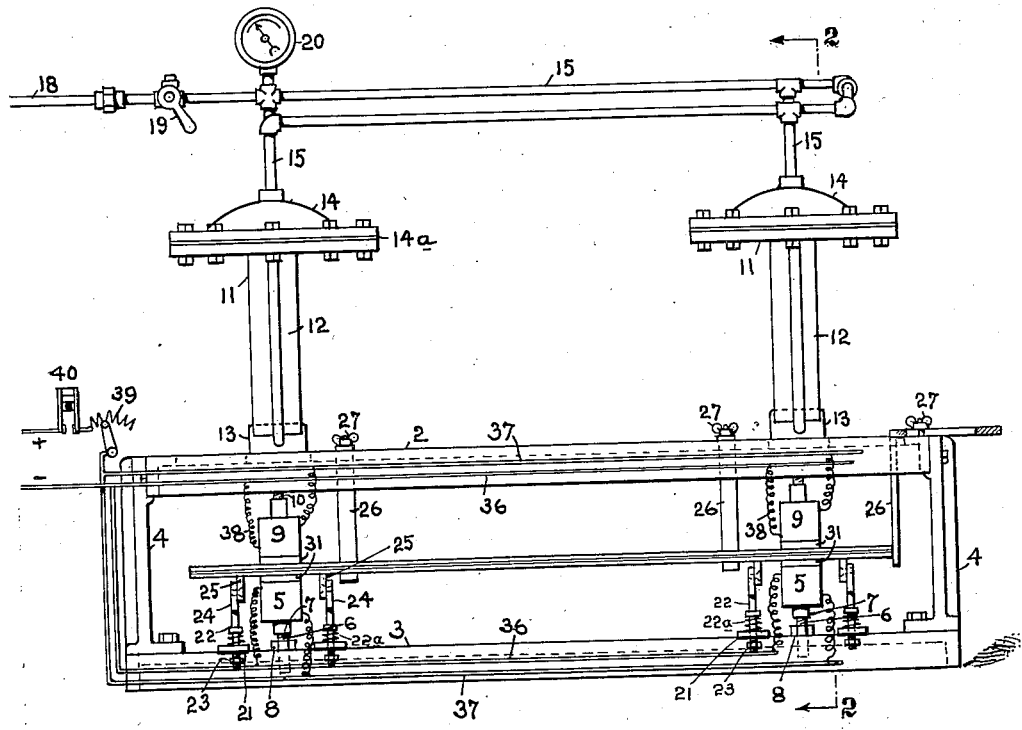

March 14, 1933.  A. G. WORRALL  1,901,574
METHOD FOR MAKING LAMINATED GLASS
Filed Sept. 6, 1929  2 Sheets-Sheet 1

Inventor
Arthur G. Worrall.
By
Attorney.

March 14, 1933. A. G. WORRALL 1,901,574
METHOD FOR MAKING LAMINATED GLASS
Filed Sept. 6, 1929 2 Sheets-Sheet 2
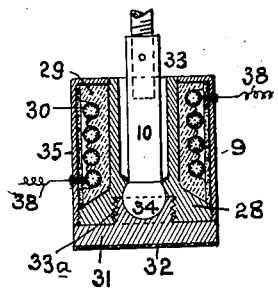
FIG. 3
FIG. 4 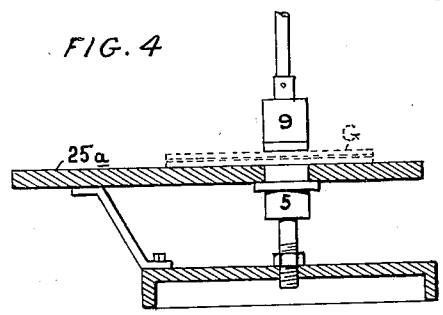 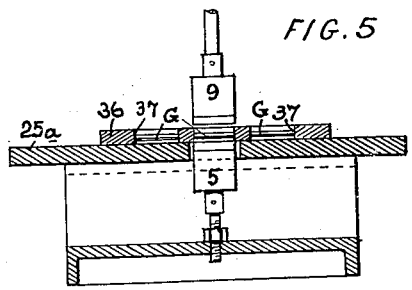 FIG. 5
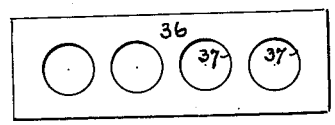
FIG. 6
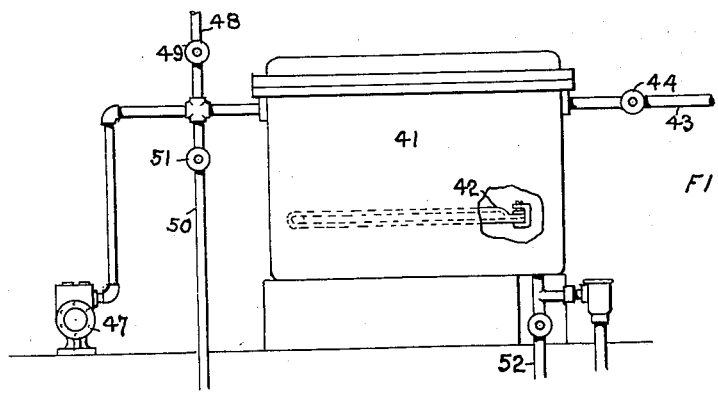
FIG. 7
Inventor.
Arthur G. Worrall.
By 
Attorney.

Patented Mar. 14, 1933

1,901,574

UNITED STATES PATENT OFFICE

ARTHUR G. WORRALL, OF PHILADELPHIA, PENNSYLVANIA, ASSIGNOR TO LOUIS J. KOLB, OF PHILADELPHIA, PENNSYLVANIA, TRADING AS SAFETEE GLASS COMPANY

METHOD FOR MAKING LAMINATED GLASS

Application filed September 6, 1929. Serial No. 390,666.

Heretofore, it has been customary to make reinforced or laminated glass by forming a sandwich of two sheets of glass and an interposed sheet of celluloid, with and without a cementing coating between the respective sheets of glass and the celluloid, and by heat and pressure causing the sheets to be welded or united together to form the laminated structure. Where the sheets are of large area it has been customary to retain the relative positioning of the glass and celluloid sheets one upon the other, by use of stickers of paper placed about the edges of the assembled sheets for retaining them in proper relative positions when handling them preliminary to and during their subjection to heat and pressure. This procedure for maintaining proper relative alignment between the superposed sheets during the making of the laminated glass, also reduces the labor of grinding in finishing the edges of the product. Where the articles are small in area, such as suitable for gas masks and goggles, the glass and celluloid sheets may be positioned relatively to each other by placing them in templets having circular holes within which the glass and celluloid sheets are placed to align their edges during the application of heat and pressure to the top and bottom of the sandwich or assembled unit.

I have found that the union between the glass and celluloid sheets may be made by pressure between electrically heated clamping dies, the pressure being maintained for a sufficient time and in amount to insure the softening and shaping of the celluloid (and binder when used), by the electrically applied heat.

The temperature imparted to the dies at the time of application of the pressure, as well as the extent of time consumed in the operation of heating and pressing, will vary somewhat according to the thickness of the glass and celluloid sheets, but may very readily be determined by experiment. I, therefore, do not limit my improvements in these respects, beyond the requirement that the application of electrical heat must be capable of softening the celluloid or binder material when employed therewith or both; and the application of pressure to the glass sheets must be sufficient to shape the celluloid or binder material to insure the entire expulsion of air, gases and moisture which may be present during the period of heating.

In the making of large laminated sheets, I employ my improved method to unite the sheets of glass and celluloid at a few separated places over the area of the associated glass and celluloid sheets, whereby they are "spot welded" as it were. When this is done, the sheets will be immovable one to the other and may be handled as a sandwich without danger of relative displacement of its parts. The connected sheets so formed are then placed as a unit within a flexible bag and sealed, the air, gases and vapors preferably exhausted and removed from the bag, and thereafter the latter and its contents subjected to heat and pressure during the full completion of the welding operation throughout the entire surface area of the glass.

In the making of small articles such as lenses for gas masks, goggles, etc., I form the electrically heated dies of a shape to apply pressure throughout the glass area at one operation, so that when the pressure is applied, after the electrically heating step is completed, said pressure will be uniform or substantially so, over the entire laminated glass article. In this case the glass and celluloid sheets may be assembled within a templet which properly positions them one upon another, the dies preferably fitting or aligning with the opening in the templet; and moreover, the operation termed "spot welding" in the case of treating large sheets, provides the entire heating and pressure steps in the process when making the small laminated articles.

It will also be understood that in the carrying out of my improved method, the assembled glass and celluloid may be placed upon a table, preferably of insulating material, on which also rests the templet (when used), and the heating may be wholly performed by the upper movable heating and pressure die. If desired, the table may have heating coils embedded in its surface immediately below the movable heating and pressure dies. It is pointed out, however, that the table, except the portions immediately below the movable heating and pressure die, will perform no material function except acting as a support for the templet when used and for temporarily supporting small laminated glass articles.

In practice, in making large laminated plates, I may entirely omit the table except as the lower stationary heating and supporting dies may be considered jointly acting or functioning as separated or spaced portions of a table support.

My invention also includes apparatus by which to put my improved method into commercial practice, all of which improvements are fully described hereinafter and more particularly pointed out in the claims.

Figure 2:
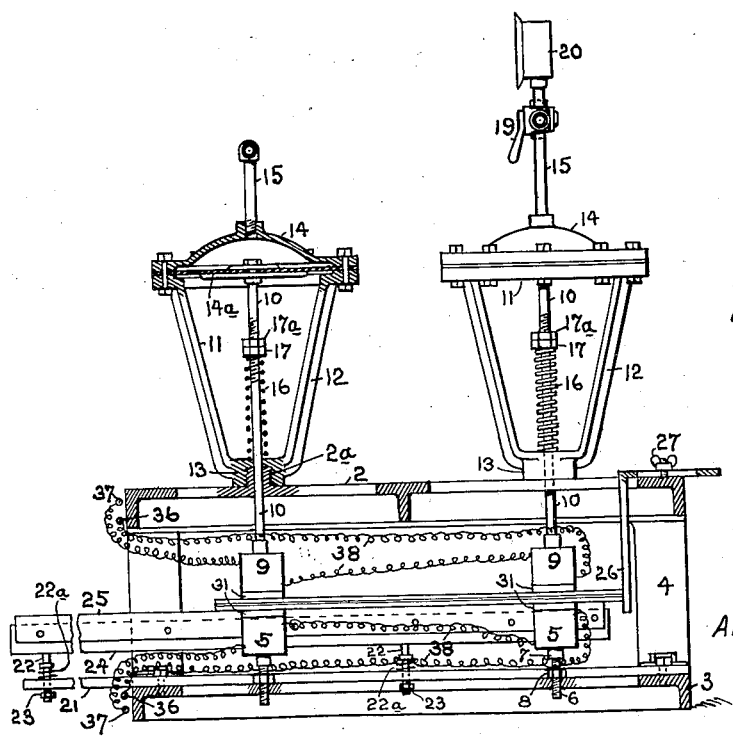

Referring to the drawings: Fig. 1 is a front elevation of my improved apparatus; Fig. 2 is a transverse section of the same taken on line 2—2 of Fig. 1; Fig. 3 an enlarged vertical section through one of the electrically heated pressure dies; Fig. 4 is a transverse sectional view showing the use of a table in association with the lower dies; Fig. 5 is a similar view showing the employment of a templet; and Fig. 6 is a plan view of the templet; Fig. 7 is a front elevation of a pressure tank for performing the final pressing operation.

2 is the top plate and 3 the bottom or bed plate of the apparatus, said plates being connected by end frames 4. This general frame may be made in any manner desired. The lower and stationary dies are shown at 5 and are supported from the bed plate by upright studs 6 which are adjustably screwed thereinto and held against accidental looseness by lock nuts 8. As shown, there are four of these stationary dies 5, and when they are to be used conjointly to support a single sheet of glass their upper surfaces are arranged in the same horizontal plane. The special construction of these dies will be presently described.

9 are upper movable dies of the same character and number as the lower stationary dies 5, and are respectively positioned above and coact with said lower dies to clamp the glass sheet between them. As shown, the lower dies 5 have their clamping surfaces 31 directed upward, while the upper dies 9 have their clamping surfaces directed downward, said surfaces being preferably of the same areas and adapted to clamp the sandwich of glass and celluloid G between them, as shown in Figs. 1, 2 and 5.

The upper dies 9 are secured to the lower ends of the upright rods 10 and said rods guided through nippled portions 2a of the top plate 2 and arranged to be operated by a pressure applying means constructed as follows: a U-shaped frame 12 having a bottom hub 13 is secured upon the nipple 2a of the top plate 2 of the main frame and carries at its upper end a diaphragm motor device 14, the diaphragm 14a of which is secured to the clamp operating rod 10. The space within the dome part 14 and above the diaphragm, is in communication, by pipes 15, with a source of compressed air (or other fluid pressure) at 18 and having a three-way control or shut off valve 19. By admitting air pressure to the dome 14 the diaphragm 14a is depressed and with it the die carrying rod 10, and this movement is resisted by a coil spring 16 surrounding the rod and acting upon it through a collar 17 adjustably screwed upon the rod and held in adjustable position by a lock-nut 17a. The spring acts to raise the rod and its die when the air pressure in the dome is released by the operation of the three-way valve 19, which permits the air from the dome to be expelled by the upward spring pressure on the diaphragm.

When a plurality of diaphragm motor devices is employed, as illustrated in Figs. 1 and 2, the supply of compressed air is made to act upon all of them at the same time, so that the clamping action of all the dies takes place simultaneously. Similarly, the release of the compressed air takes place from all of the diaphragm motor devices by the single operation of the valve 19 and permits the springs 16 of said devices to automatically raise the die members 9.

Referring now to the special construction of the die members 5 and 9, and as more particularly shown in Fig. 3, I prefer the following constructions: the lower end of the rod 10 is provided with a ball shaped part 34 which is clamped between the cylindrical body portion 28 and a clamping head 31 which is screwed thereupon at 33a and takes the immediate thrust of the rod. This construction provides a ball and socket union between the die member and the rod which actuates it, and furthermore permits a slight oscillatory movement of the die member upon the lower end of the rod, so that the clamping head 31 may adjust itself automatically to the surface of the glass sandwich which is being clamped between the die members 5 and 9 preliminary to being heated. The oscillatory movement is permitted by the body part 28 having a central opening 33 through which the rod 10 extends and which opening provides a clearance space between the rod and its interior wall. The lower face of the clamping head 31 may be provided with a surface sheet 32 formed of paper or other suitable material to prevent the hard metal surface of the die directly contacting with the glass. Surrounding the body 28 is provided a heating means consisting of an annular refractory body 29 about which is wound a resistance coil 30 through which electric current is passed for heating the die as a whole to the requisite degree necessary to provide a welding action between the glass and the celluloid. The resistance coil may be inclosed by an outer cylindrical casing 35 which may be lined with asbestos, if so desired.

It will now be understood that all of the dies are heated during the clamping and " spot welding ", but while I prefer that the lower dies 5 shall be heated similarly to the upper dies, I do not restrict myself in this respect, as in cases whereby the laminated glass is very thin the heating may be performed by the upper dies alone.

The electric current for heating the resistance coils of the die members may be supplied in any convenient manner. As shown, I provide longitudinal circuits 36 and 37 conveniently secured to lower and upper frames of the machine and across which are circuits 38 in parallel which include the heating coils 30 of the clamping dies, each cross connection including a pair of the resistance coils of the clamping dies. The current supply may be from an external source and controlled by a switch 40 of usual character; and the resistance of the circuit as a whole may be adjusted by a variable resistance 39. The electrical circuits that supply current to the upper clamping dies 9 extend downward from above, whereas, those supplying current to the lower clamping dies 5 extend upwardly from the longitudinal conductors so that no obstruction by the wiring will extend across the space to be occupied by the glass when being inserted between and removed from the dies.

Where the laminated glass is of extended area it is desirable that there should be provided a convenient support therefor, whereby the glass may be shifted into position between the dies without excessive rubbing thereon. Current may be continuously supplied to the dies during their use.

A simple manner of accomplishing this result is shown, more particularly in Figs. 1 and 2, wherein there are provided frames 21 on the base frame 3 and which support upwardly directed table frame portions upon which the glass is placed and supported when being inserted between and removed from the clamping and heating dies. These table frames comprise metal frames 24 faced with wooden strips 25 extending slightly above the metal frames, the latter having downwardly extended studs 22 which slidably project through the supporting frames 21. Springs 22a yieldingly press the table frames upward and nuts 23 upon the studs 22 below the said supporting frames limit the upward movement of the said table frames. In this manner, the upper edges of the wooden facing parts 25 form the direct yieldingly sustaining means for the glass and by reason of which, its coming into contact with the metal portions 24 is avoided, and the level of the upper surfaces of said glass supporting portions may be normally adjusted to a slightly higher level than the upper surfaces of the clamping dies 5. The approximate level of the table portions 25 may be such that when the pressure of the dies is relieved the sandwich is sustained just clear of them, and the extent of this clearance may be adjusted by the nuts 23. It will, however, be understood that where the parts are accurately made, provision for adjustment may be omitted, and this will be understood by reference to Figs. 4 and 5, wherein the extended flat table portion 25a may be fitted snugly around the lower die 5 so that the surface of the die and the surface of the table may be in accurate alinement. I prefer, however, to yieldingly support the table portions 25 as shown, for example, in Figs. 1 and 2.

While it is not vital just where upon the sandwich the "spot welding" unions are to be formed, it is convenient, where a large number of similar laminated sheets of the same size or shape are to be made, that suitable guiding means should be provided whereby the sheets making up the sandwich may be definitely positioned, one upon the other, immediately before the "spot welding" takes place. This may be accomplished by employing a plurality of the guides 26 adjustably clamped upon the main frame by wing nuts 27, and against the upright member of which the glass and celluloid sheets may be aligned, the downwardly projecting portions of the guides 26 extending across the plane of the table supporting means 25, and therefore across the plane of the assembled sandwich when resting upon the said table supporting means.

Where the laminated plate is of a medium size, it will be understood that it may be "spot welded" by two sets of the die members 5 and 9, as, for example, would be indicated in Fig. 2; and where only one set of the die members 5 and 9 are required as in the cases of welding gas mask and goggle lenses, the construction shown in Fig. 5 may be resorted to, which in effect is the employment of a templet resting upon the table 25a and brought into position to align the laminated glass sandwich properly between the two members 5 and 9.

In the latter case the laminated glass in lens or other form will be a completed article ready for the commercial market or use, in that the area of the single "spot welding" operation equals in area the entire area of the sandwich.

However, in the case of the larger sheets where the "spot welding" is employed for connecting the glass and celluloid into a unit for handling, the finishing of the "spot welded" sheets into laminated glass is performed by subjecting the entire sandwich to the application of heat and pressure, sufficient to insure the welding of the celluloid (with or without gelatin binder layers), preferably in a vacuo and finally cooling the same. The performance of this operation may be carried out by the use of apparatus and method described in my application Serial No. 300,173, filed August 17, 1928.

An apparatus for carrying out this final operation is graphically illustrated in Fig. 7, and comprises a pot 41 adapted to be hermetically sealed and to contain the flexible bag 42 in which the sandwich is enclosed and also hermetically sealed, whereby the air, gases and moisture are withdrawn from the sandwich before heat and pressure are applied. Steam may be supplied by a pipe 43 under control of the valve 44, water of condensation may be removed by a pipe 45 through a back pressure valve 46. Compressed air may be supplied to the pot by a compressor 47. Air may be vented from the pot by a pipe 48 having a valve 49, and cooling water may be supplied to the pot by a pipe 50 having a control valve 51.

Using the apparatus last described for the purpose stated, the bag with the enclosed sandwich is placed within the pot 41, which is then hermetically sealed. Steam at a pressure of approximately 15 pounds is then supplied to the pot and about the bag, which brings the temperature of the bag and its enclosed sandwich to approximately 240 degrees F., and said temperature is maintained for a sufficient length of time to enable the celluloid or binder material between the glass sheets to become pliable and more or less plastic. When the softening of the celluloid and binder is accomplished, the steam is shut off by valve 44, and the bag and its contents are then subjected to a pressure of about 160 pounds by the admission of compressed air from the compressor 47, said pressure being maintained for a few minutes to complete the weld. When this is completed the compressor is shut off, and cold water is admitted by pipe 50 to the pot 41, and about the bag 42, and allowed to escape through a valve waste pipe 52, until the sandwich has been cooled, and thereupon the pot is opened, the bag removed, air admitted to the interior of the bag to permit it to be opened, and the completed sandwich is withdrawn. The weld will thus be formed partly by the "spot welding", and partly by the heat and pressure applied to the sandwich in the treatment within the pot.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to details, as the same are susceptible of modification in various particulars without departing from the spirit or scope of the invention.

Having now described my invention which I claim as new and desire to secure by Letters Patent is:

1. The herein described method which consists in assembling sheets of glass and celluloid to form a sandwich, "spot welding" the sheets of glass and celluloid to physically connect them at intervals in respect to their surfaces whereby they may be handled as a unit, and thereafter subjecting the "spot welded" unit to heat and pressure and subsequent cooling to form a laminated glass structure.

2. The invention according to claim 1, wherein further, the "spot welded" operation is performed by the application of electrically produced heat restricted to the area of the "spot welded" portions.

In testimony of which invention, I hereunto set my hand.

ARTHUR G. WORRALL.